(12) United States Patent
Seda et al.

(10) Patent No.: US 7,673,442 B2
(45) Date of Patent: Mar. 9, 2010

(54) TURBOFAN ENGINE COWL ASSEMBLY

(75) Inventors: Jorge Francisco Seda, Cincinnati, OH (US); Thomas Ory Moniz, Loveland, OH (US); Robert Joseph Orlando, West Chester, OH (US); Alan Roy Stuart, Cincinnati, OH (US); Kenneth S. Scheffel, Edgewood, KY (US)

(73) Assignee: General Electric Company, Schenectady, NY (US)

( * ) Notice: Subject to any disclaimer, the term of this patent is extended or adjusted under 35 U.S.C. 154(b) by 668 days.

(21) Appl. No.: 11/559,761

(22) Filed: Nov. 14, 2006

(65) Prior Publication Data
US 2008/0110153 A1 May 15, 2008

(51) Int. Cl.
*F02K 1/54* (2006.01)
(52) U.S. Cl. .............. 60/226.2; 60/725; 239/265.31
(58) Field of Classification Search ............. 60/226.2, 60/230, 262, 725; 239/265.57, 265.29, 265.31; 244/110 B
See application file for complete search history.

(56) References Cited

U.S. PATENT DOCUMENTS

| 3,829,020 | A | 8/1974 | Stearns | |
| 4,030,291 | A | 6/1977 | Sargisson | |
| 5,778,659 | A | 7/1998 | Duesler | |
| 5,806,302 | A | 9/1998 | Cariola | |
| 6,438,942 | B2 * | 8/2002 | Fournier et al. | 60/226.2 |
| 6,546,715 | B1 * | 4/2003 | Blevins et al. | 60/226.2 |
| 6,663,042 | B2 | 12/2003 | Hatrick et al. | |
| 6,725,542 | B1 | 4/2004 | Maguire | |

FOREIGN PATENT DOCUMENTS

| FR | 2 887 225 A1 | 12/2006 |
| GB | 2 395 175 A | 5/2004 |
| WO | 2007/128890 A1 | 11/2007 |

OTHER PUBLICATIONS

GB Search Report, Application No. GB0722175.7 (Feb. 27, 2008).

* cited by examiner

*Primary Examiner*—Louis J Casaregola
(74) *Attorney, Agent, or Firm*—William Scott Andes, Esq.; Armstrong Teasdale LLP

(57) ABSTRACT

A method for operating a turbofan engine assembly is provided. The turbofan engine assembly includes a core cowl which circumscribes the core gas turbine engine, a nacelle positioned radially outward from the core cowl, a fan nozzle duct having an area defined between the core cowl and a portion of the nacelle, a first cowl and a second cowl that define a portion of the nacelle wherein the second cowl is repositionable with respect to the first cowl, and a thrust reverser assembly wherein the second cowl surrounds the thrust reverser assembly. The method includes varying an operating speed of the fan assembly from a first operating speed to a second operating speed. The method further includes selectively positioning the second cowl between a first operational position and a second operational position to vary the area of the fan nozzle duct to facilitate improving engine efficiency at the second operating speed. The method further includes selectively positioning the second cowl between the second operational position and a third operational position to vary an amount of air flowing through the fan nozzle duct and the thrust reverser assembly, wherein the second operational position substantially prevents airflow from flowing through the thrust reverser assembly to improve the efficiency of the turbofan engine, and wherein the third operational position directs airflow through the thrust reverser assembly.

13 Claims, 4 Drawing Sheets

TURBOFAN ENGINE COWL ASSEMBLY

BACKGROUND OF THE INVENTION

This invention relates generally to turbofan engines, and more particularly to a thrust reverser assembly that may be utilized with a turbofan engine.

At least one known turbofan engine includes a fan assembly, a core gas turbine engine enclosed in an annular core cowl, and a fan nacelle that surrounds a portion of the core gas turbine engine. The fan nacelle is spaced radially outward from the annular core cowl such that the core cowl and fan nacelle form a fan nozzle duct having a discharge area.

At least some known turbofan engines include a thrust reverser assembly. Known thrust reverser assemblies include a first fixed cowl and a second cowl that is axially translatable with respect to the first cowl. Generally, an actuator is coupled to the second cowl to reposition the second cowl with respect to the first cowl. As the second cowl is repositioned, airflow is discharged from the fan nozzle duct through the thrust reverser assembly. As airflow is discharged through the thrust reverser assembly and the fan assembly operates at peak efficiency, undesirable increases in fuel burn result.

BRIEF DESCRIPTION OF THE INVENTION

In one aspect, a method for operating a turbofan engine assembly is provided. The turbofan engine assembly includes a core cowl which circumscribes the core gas turbine engine, a nacelle positioned radially outward from the core cowl, a fan nozzle duct having an area defined between the core cowl and a portion of the nacelle, a first cowl and a second cowl that define a portion of the nacelle wherein the second cowl is repositionable with respect to the first cowl, and a thrust reverser assembly wherein the second cowl surrounds the thrust reverser assembly. The method includes varying an operating speed of the fan assembly from a first operating speed to a second operating speed. The method further includes selectively positioning the second cowl between a first operational position and a second operational position to vary the area of the fan nozzle duct to facilitate improving engine efficiency at the second operating speed. The method further includes selectively positioning the second cowl between the second operational position and a third operational position to vary an amount of air flowing through the fan nozzle duct and the thrust reverser assembly, wherein the second operational position substantially prevents airflow from flowing through the thrust reverser assembly to improve the efficiency of the turbofan engine, and wherein the third operational position directs airflow through the thrust reverser assembly.

In a further aspect, a thrust reverser assembly for a turbofan engine assembly is provided. The turbofan engine assembly includes a core gas turbine engine, a core cowl which circumscribes the core gas turbine engine, a nacelle positioned radially outward from the core cowl, a fan nozzle duct having an area defined between the core cowl and a portion of the nacelle, and a thrust reverser positioned within a portion of the nacelle. The thrust reverser assembly includes a first cowl, a second cowl repositionable with respect to the first cowl for varying the area of the fan nozzle duct, and at least one flow directing member coupled to the second cowl to selectively impede airflow from flowing through a cavity defined between the first cowl and the second cowl improving engine efficiency.

In a further aspect, a turbofan engine assembly is provided. The turbofan engine assembly includes a core gas turbine engine, a core cowl which circumscribes the core gas turbine engine, a nacelle positioned radially outward from the core cowl, a fan nozzle duct defined between the core cowl and the nacelle, and a thrust reverser assembly. The thrust reverser assembly includes a first cowl, a second cowl repositionable with respect to the first cowl for varying the area of the fan nozzle duct, and at least one flow directing member coupled to the second cowl to selectively impede airflow from flowing through a cavity defined between the first cowl and the second cowl improving engine efficiency.

DETAILED DESCRIPTION OF THE INVENTION

Figure 1:
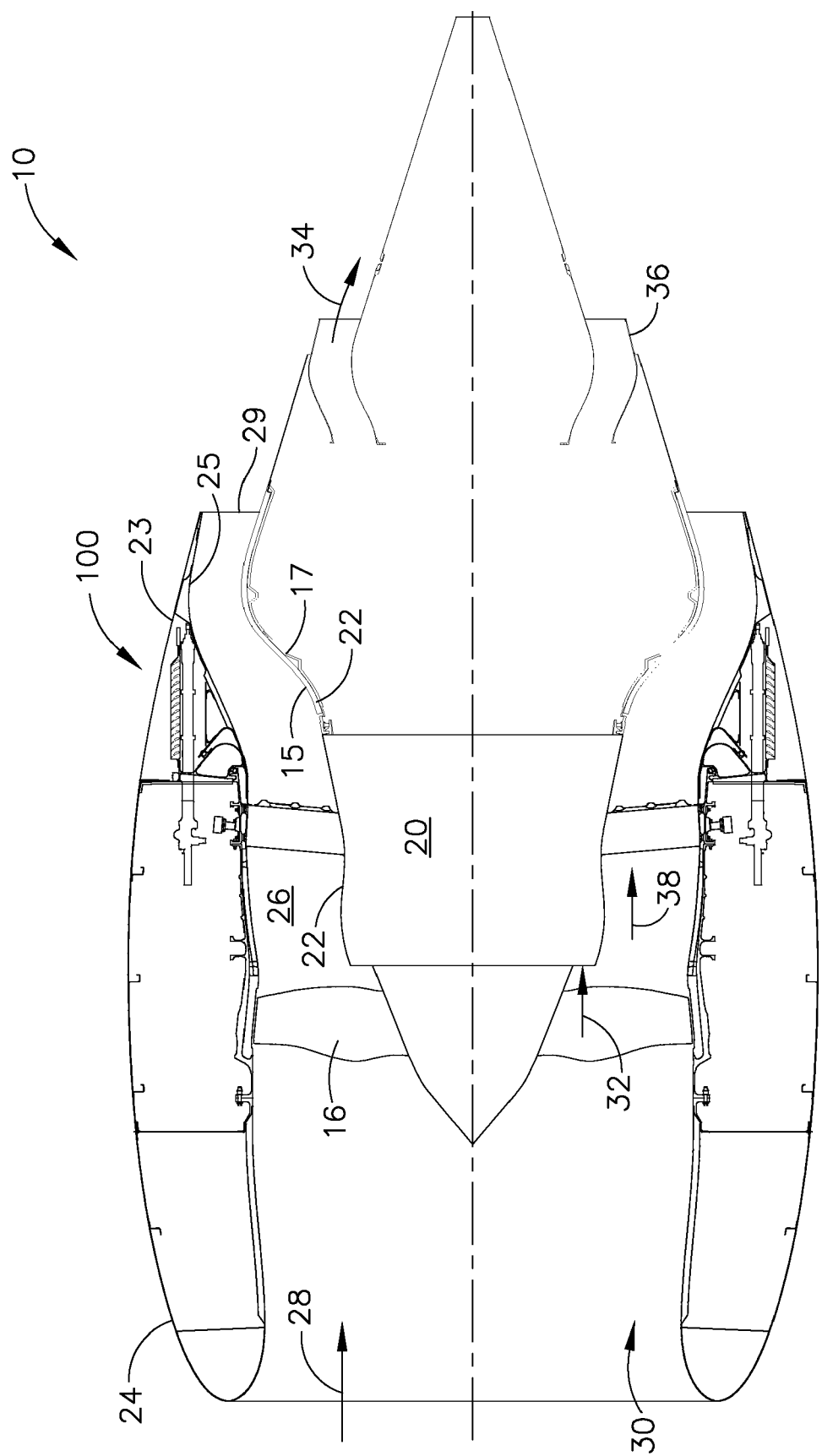
FIG. 1 is a schematic view of an exemplary aircraft turbofan engine assembly that includes an exemplary thrust reverser assembly.

FIG. 1 is a side view of an exemplary turbofan engine assembly 10 that includes an exemplary thrust reverser assembly 100. In the exemplary embodiment, thrust reverser assembly 100 is a fixed cascade thrust reverser and will be discussed in more detail below. Moreover, in the exemplary embodiment, turbofan engine assembly 10 includes a core gas turbine engine 20 that includes a high-pressure compressor, a combustor, and a high-pressure turbine (all not shown). Turbofan engine assembly 10 also includes a low-pressure turbine (not shown) that is disposed axially downstream from core gas turbine engine 20, and a fan assembly 16 that is disposed axially upstream from core gas turbine engine 20. In the exemplary embodiment, turbofan engine assembly 10 includes an annular core cowl 22 that extends around core gas turbine engine 20 and includes a radially outer surface 15 and a radially inner surface 17. Turbofan engine assembly 10 also includes an inlet 30, a first outlet 29, and a second outlet 34.

Turbofan engine assembly 10 further includes a fan nacelle 24 that surrounds fan assembly 16 and is spaced radially outward from core cowl 22. Nacelle 24 includes a radially outer surface 23 and a radially inner surface 25. A fan nozzle duct 26 is defined between radially outer surface 15 of core cowl 22 and radially inner surface 25 of nacelle 24.

During operation, airflow 28 enters inlet 30, flows through fan assembly 16, and is discharged downstream. A first portion 32 of airflow 28 is channeled through core gas turbine engine 20, compressed, mixed with fuel, and ignited for generating combustion gases which are discharged from core gas turbine engine 20 through second outlet 34. A second portion 38 of airflow 28 is channeled downstream through fan nozzle duct 26 which is discharged from fan nozzle duct 26 through first outlet 29.

Figure 2:
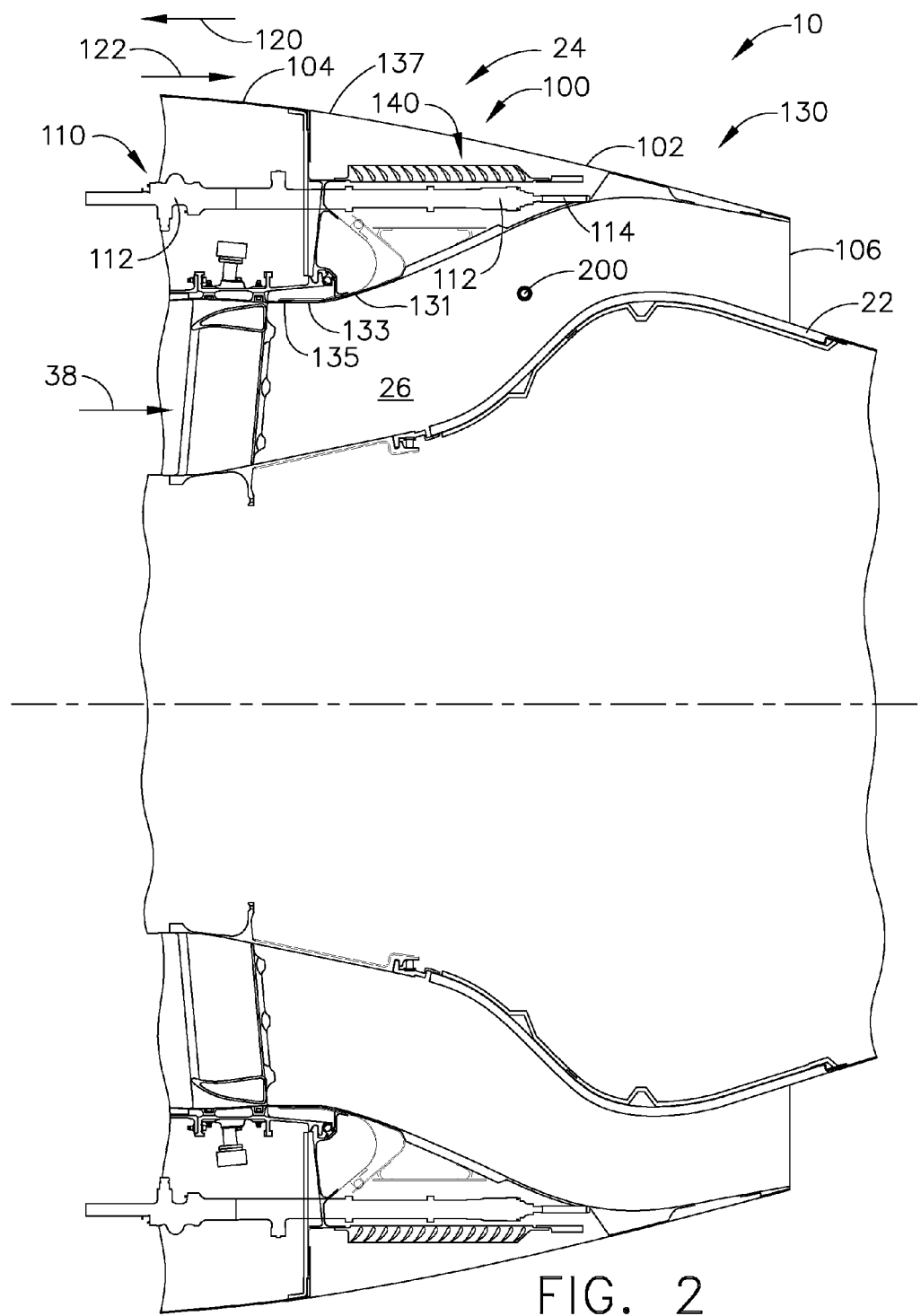
FIG. 2 is a partial sectional side view of the thrust reverser assembly shown in FIG. 1 in a first operational position.
Figure 3:
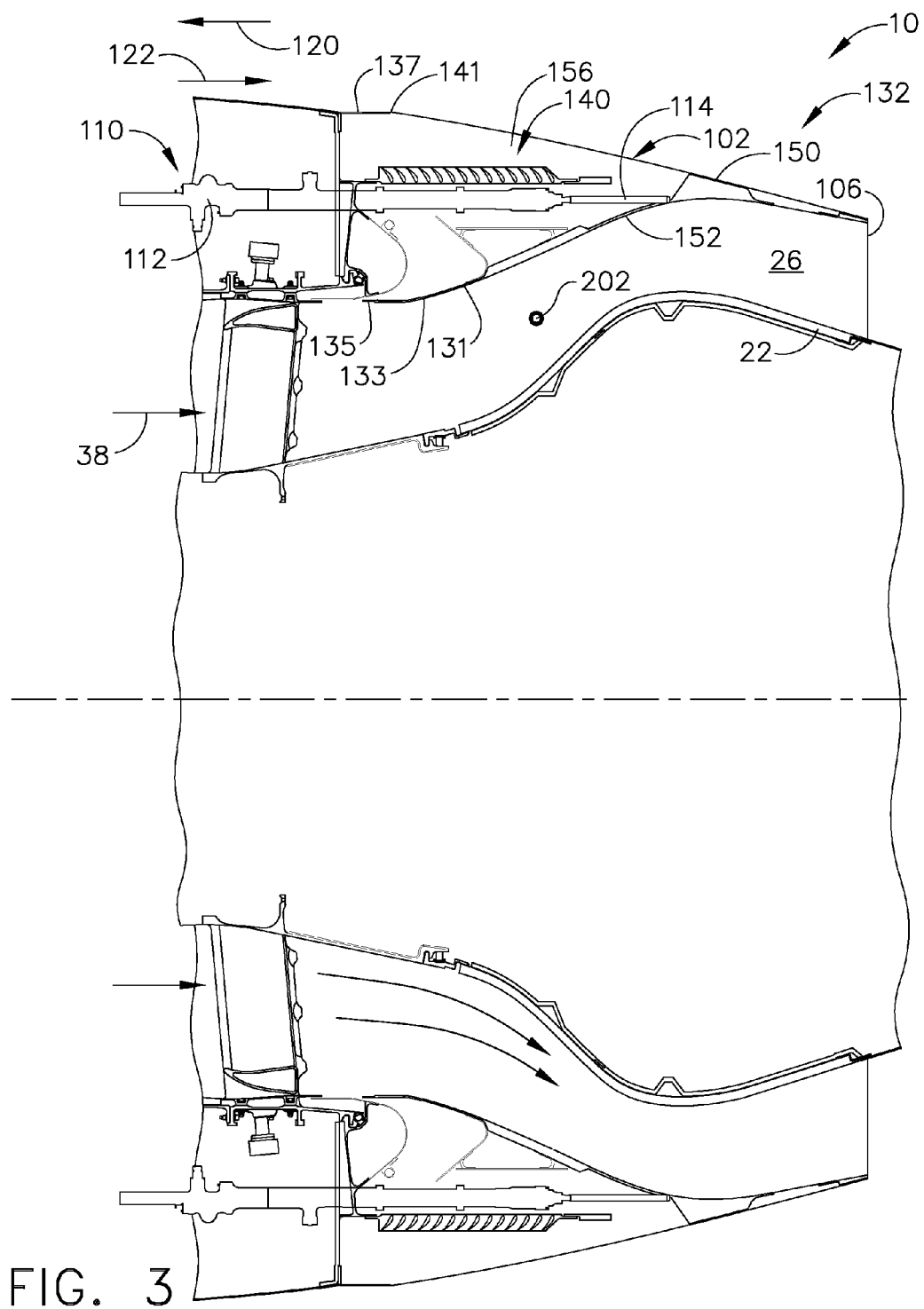
FIG. 3 is a partial sectional side view of the thrust reverser assembly shown in FIGS. 1 and 2 in a second operational position.
Figure 4:
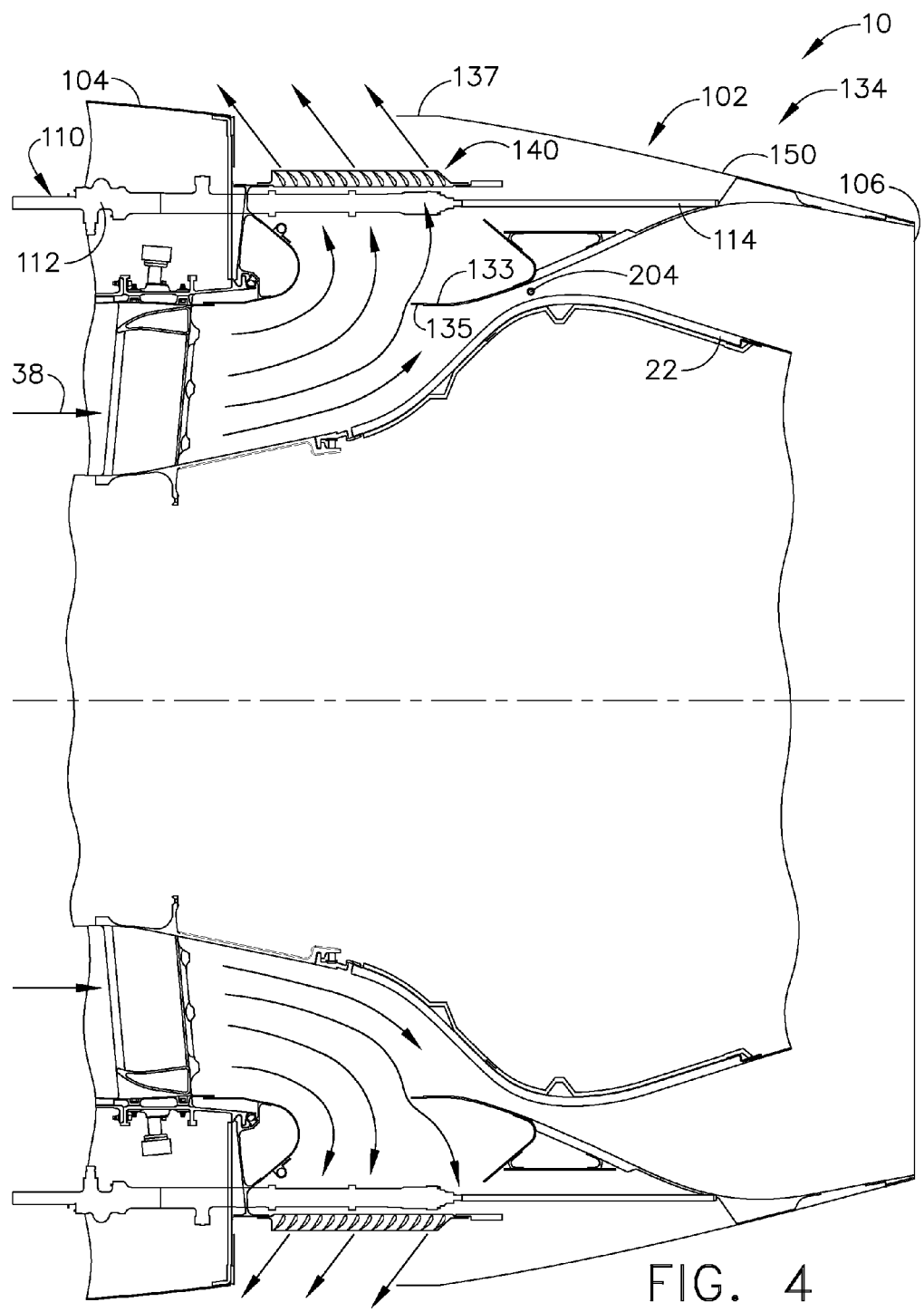
FIG. 4 is a partial sectional side view of the thrust reverser assembly shown in FIGS. 1, 2, and 3 in a third operational position.

FIG. 2 is a partial sectional side view of thrust reverser assembly 100 in a first operational position 130. FIG. 3 is a partial sectional side view of thrust reverser assembly 100 in a second operational position 132. FIG. 4 is a partial sectional side view of thrust reverser assembly 100 in a third operational position 134. In the exemplary embodiment, thrust reverser assembly 100 includes an annular aft cowl 102 which defines a portion of nacelle 24. In the exemplary embodiment, aft cowl 102 is movably coupled to a stationary forward cowl 104.

In the exemplary embodiment, thrust reverser assembly 100 also includes an actuator assembly 110 that is coupled to aft cowl 102 to selectively translate aft cowl 102 in a generally axial direction relative to forward cowl 104 to vary the amount of air flowing through fan nozzle duct 26 and thrust reverser assembly 100. In the exemplary embodiment, actuator assembly 110 is positioned within a portion of the area defined by nacelle 24. Actuator assembly 110 includes a plurality of circumferentially-spaced actuators or motors 112, and a plurality of extending rods 114, such that the rods may be, but shall not be limited to, ball screws. In the exemplary embodiment, each rod 114 is coupled to a respective motor 112 and to aft cowl 102 such that energizing motors 112 causes aft cowl 102 to be translated in either a forward direction 120 or an aft direction 122 depending on the rotation produced by the energization of motors 112. In the exemplary embodiment, actuator assembly 110 may be, but is not limited to, electrically, pneumatically, or hydraulically powered to aft cowl 102 from a first operational position or stowed position 130, in which aft cowl 102 is fully retracted against forward cowl 104, to a second operational position 132, wherein aft cowl 102 is translated to a position a distance aftward and away from forward cowl 104. In the first operational position or stowed position 130, fan nozzle duct 26 has a first fan nozzle duct area 200 defined between radially outer surface 15 of core cowl 22 and aft cowl 102. In the second operational position 132, fan nozzle duct 26 has a second fan nozzle duct area 202 defined between radially outer surface 15 of core cowl 22 and aft cowl 102. In the exemplary embodiment, second fan nozzle duct area 202 is less than first fan nozzle duct area 200. Operation of actuator assembly 110 also enables aft cowl 102 to translate from second operational position 132 to either a third operational position 134 or to be returned to first operational position 130 depending on the energization of motors 112. In third operational position 134, aft cowl 102 is fully extended from forward cowl 104. In third operational position 134, fan nozzle duct 26 has a third fan nozzle duct area 204 defined between radially outer surface 15 of core cowl 22 and aft cowl 102. In the exemplary embodiment, third fan nozzle duct area 204 is less than first and second duct areas 200 and 202.

In the exemplary embodiment, thrust reverser assembly 100 also includes a plurality of cascade turning vanes 140, referred to herein as a cascade box, that are positioned between, or at the juncture of aft and forward cowls 102 and 104. As such, cascade box 140 is selectively positioned in flow communication with second portion 38 of airflow 28 channeled through fan nozzle duct 26 in third operational position 134.

In the exemplary embodiment, aft cowl 102 includes a radially outer panel 150 and a radially inner panel 152 that is coupled to radially outer panel 150. In the exemplary embodiment, a cavity 156 is defined between outer and inner panels 150 and 152, respectively. Cavity 156 is sized to house cascade box 140 therein when aft cowl 102 is in first operational position 130.

In the exemplary embodiment, a flow directing member 133 is coupled to an upstream end 131 of inner panel 152 with a lap joint (not shown). More specifically, flow directing member 133 extends a distance upstream from upstream end 131. In an alternative embodiment, flow directing member 133 is formed integrally with aft cowl 102. Flow directing member 133 includes a seal member 135 that extends from a leading edge side of flow directing member 133. A second flow directing member 137 extends upstream from an upstream end 141 of outer panel 150. In the exemplary embodiment, second flow directing member 137 includes a seal member similar to seal member 135. In an alternative embodiment, aft cowl 102 does not include second flow directing member 137. In another alternative embodiment, aft cowl 102 includes either flow directing member 133 or flow directing member 137. In an alternative embodiment, at least one of the aft and forward cowl 102 and 104 includes at least one noise reduction panel (not shown) such that the noise reduction panel facilitates reducing engine noise during operation by absorbing acoustic energy.

During operation of an aircraft, a pilot/operator may selectively position aft cowl 102 in first, second, or third operational position 130, 132, and 134. For example, the operator may selectively position aft cowl 102 in first operational position (i.e. stowed position) 130 while the aircraft is operating in a takeoff mode or a cruise mode (i.e. during normal flight conditions). In first operational position 130, aft cowl 102 is fully retracted against forward cowl 104 such that substantially all of second portion 38 of airflow 28 discharged from fan assembly 16 is channeled through fan nozzle duct 26 and exits fan nozzle duct 26 at first outlet 29.

When the aircraft is in off-design flight conditions (such as descent, landing, or other low thrust conditions), the pilot/operator may optionally select second operational position (i.e. an intermediate mode of operation) 132 by axially translating aft cowl 102 in aft direction 122 from first operational position 130 while concurrently reducing the fan duct area. Specifically, first fan nozzle duct area 200 is reduced to second fan nozzle duct area 202 and, as a result, the amount of airflow 28 flowing through fan nozzle duct 26 is reduced causing the fan exit pressure to increase, and therefore the efficiency of fan assembly 16 is increased. Although aft cowl 102 is partially extended from forward cowl 104 and fan nozzle duct area is reduced from first fan nozzle duct area 200 to second fan nozzle duct area 202, second portion 38 of airflow 28 is not channeled through cascade box 140. Specifically, flow directing members 133 and 137 substantially prevent second portion 38 of airflow 28 from entering cascade box 140. Each flow directing member 133 and 137 generally lengthens each respective inner and outer panel 152 and 150 of aft cowl 102 to block air from entering cascade box 140 in second operational position 132. To minimize the pressure drop due to aerodynamic losses, flow directing members 133 and 137 prevent air from flowing through cascade box 140 and prevent deployment of the thrust reverser assembly 100. When the aft cowl is in second operational position (i.e. partially retracted) 132, nacelle 24 operates at performance similar to the current production nacelles. Closing of the fan nozzle duct area during certain operating conditions, such as take-off or descent, can improve fuel burn by raising the fan operating line closer to the peak efficiency line. In addition, reduced noise is achieved as a result of reduced fan wake/outlet guide vane (OGV) interaction. Opening the fan nozzle during certain operating conditions, such as low altitude, can also reduce noise as a result of reduced jet velocity. Noise reduction benefit of varying the fan nozzle can also be traded to further reduce fan diameter and corresponding fuel burn. By improving the engine efficiency during descent, landing, or other low thrust conditions, with use of flow directing members 133 and 137, the engine has approximately a 1.0% better fuel-burn than other known engines wherein the fan nozzle duct area is fixed.

By improving fan efficiency, noise reduction is improved. Specifically, in the exemplary embodiment, the fan diameter is reduced 2.2" while still maintaining the same noise level. In an alternative embodiment, the fan diameter may be reduced up to approximately 3".

When the aircraft has landed, and an operator desires to effect reverse thrust, an operator may choose to move aft cowl 102 from either the first or second operational position 130 and 132, respectively, to the third operational position 134 while concurrently reducing the fan duct area. Specifically, in the exemplary embodiment, second fan nozzle duct area 202 is reduced to a third fan nozzle duct area, i.e. substantially zero area, 204 to restrict fan flow. In the third operational position 134, duct area 204 prevents all of second portion 38 of airflow 28 from being channeled through fan nozzle duct 26 and therefore channels substantially all of second portion 38 of airflow 28 through cascade box 140 facilitating effecting reverse thrust to slow the aircraft.

The method herein includes varying an operating speed of the fan assembly from a first operating speed to a second operating speed. The method further includes selectively positioning the second cowl between a first operational position and a second operational position to vary the area of the fan nozzle duct to facilitate improving engine efficiency at the second operating speed. The method further includes selectively positioning the second cowl between the second operational position and a third operational position to vary an amount of air flowing through the fan nozzle duct and the thrust reverser assembly, wherein the second operational position substantially prevents airflow from flowing through the thrust reverser assembly to improve the efficiency of the turbofan engine, and wherein the third operational position directs airflow through the thrust reverser assembly.

Described herein is a thrust reverser assembly and an axially translating aft cowl that may be utilized on a wide variety of turbofan engine assemblies for use with an aircraft. The aft cowl with a flow directing member described herein improves engine performance during off-design flight conditions by reducing the fan nozzle duct area while simultaneously preventing air from flowing through thrust reverser assembly with the use of flow directing members. The flow directing member is a relatively low cost and low weight modification to the thrust reverser assembly and increases engine efficiency.

An exemplary embodiment of a thrust reverser assembly for a turbofan engine assembly is described above in detail. The assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A thrust reverser assembly for a turbofan engine assembly, the engine assembly including a core gas turbine engine, a core cowl which circumscribes the core gas turbine engine, a nacelle positioned radially outward from the core cowl, a fan nozzle duct having an area defined between the core cowl and a portion of the nacelle, and a thrust reverser positioned within a portion of the nacelle, said thrust reverser assembly comprising:
   a first cowl;
   a second cowl repositionable with respect to said first cowl for varying the area of said fan nozzle duct;
   an actuator assembly positioned within a portion of said nacelle and is configured to couple said second cowl such that said actuator assembly is configured to reposition said second cowl between a first operational position, a second operational position, and a third operational position wherein said second cowl is positioned substantially flush with said first cowl in said first operational position, said first operational position facilitates maximum engine efficiency with maximum thrust; and
   at least one flow directing member coupled to said second cowl to selectively impede airflow from flowing through a cavity defined between said first cowl and said second cowl.

2. A thrust reverser assembly in accordance with claim 1 wherein said second cowl comprises a radially inner and a radially outer panel such that said at least one flow directing member is positioned upstream in a general axial direction from said radially inner panel.

3. A thrust reverser assembly in accordance with claim 1 wherein said second cowl is positioned a first distance from said first cowl in said second operational position, said second operational position facilitates maximum engine efficiency with less than maximum thrust.

4. A thrust reverser assembly in accordance with claim 1 wherein said flow directing member is coupled to said second cowl with a lap joint and is configured to prevent air from flowing into said cavity.

5. A thrust reverser assembly in accordance with claim 1 wherein said at least one flow directing member is integrally formed with said second cowl.

6. A thrust reverser assembly in accordance with claim 1 wherein at least one of said first cowl and said second cowl includes at least one noise reduction panel such that said at least one noise reduction panel facilitates reducing engine noise during operation by absorbing acoustic energy.

7. A turbofan engine assembly comprising:
   a core gas turbine engine;
   a core cowl which circumscribes said core gas turbine engine;
   a nacelle positioned radially outward from said core cowl;
   a fan nozzle duct defined between said core cowl and said nacelle; and
   a thrust reverser assembly comprising:
      a first cowl;
      a second cowl repositionable with respect to said first cowl for varying the area of said fan nozzle duct;
      an actuator assembly positioned within a portion of said nacelle and is configured to couple said second cowl such that said actuator assembly is configured to reposition said second cowl between a first operational position, a second operational position, and a third operational position wherein said second cowl is positioned substantially flush with said first cowl in said first operational position, said first operational position facilitates maximum engine efficiency with maximum thrust; and
      at least one flow directing member coupled to said second cowl to selectively impede airflow from flowing through a cavity defined between said first cowl and said second cowl improving engine efficiency.

8. A turbofan engine assembly in accordance with claim 7 wherein said second cowl comprises a radially inner and a radially outer panel such that said at least one flow directing member is positioned upstream in a general axial direction from said radially inner panel.

9. A turbofan engine assembly in accordance with claim 7 further comprising an actuator assembly positioned within a portion of said nacelle and is configured to couple said second cowl.

10. A turbofan engine assembly in accordance with claim 9 wherein said actuator assembly comprises a plurality of circumferentially-spaced apart motors, and a plurality of extending rods wherein each of said plurality of rods is coupled to at least one of said plurality of motors such that said at least one motor is configured to cause said second cowl to be translated.

11. A turbofan engine assembly in accordance with claim 9 wherein said actuator assembly is at least one of electrically, pneumatically, or hydraulically powered to translate a baffle of said inner core cowl.

12. A turbofan engine assembly in accordance with claim 11 wherein said flow directing member is coupled to said second cowl with a lap joint and is configured to prevent air from flowing into said cavity.

13. A turbofan engine assembly in accordance with claim 7 wherein said at least one flow directing member is integrally formed with said second cowl.

\* \* \* \* \*